(12) United States Patent
Desai et al.

(10) Patent No.: US 10,282,076 B1
(45) Date of Patent: May 7, 2019

(54) TECHNIQUES FOR RENDERING USER INTERFACE DISPLAYS

(71) Applicant: EMC IP Holding Company LLC, Hopkinton, MA (US)

(72) Inventors: Munish T. Desai, Shrewsbury, MA (US); Scott E. Joyce, Foxboro, MA (US); Timothy J. Cox, Mendon, MA (US); Norman M. Miles, Bedford, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 239 days.

(21) Appl. No.: 14/753,463

(22) Filed: Jun. 29, 2015

(51) Int. Cl.
*G06F 3/0484* (2013.01)

(52) U.S. Cl.
CPC ...... *G06F 3/04847* (2013.01); *G06F 3/04842* (2013.01)

(58) Field of Classification Search
CPC .................... G06F 3/04847; G06F 3/04842
See application file for complete search history.

(56) References Cited

U.S. PATENT DOCUMENTS

| | | | | |
|---|---|---|---|---|
| 6,232,972 B1* | 5/2001 | Arcuri | ............... | G06F 3/0482 715/815 |
| 6,785,822 B1* | 8/2004 | Sadhwani-Tully | ............. | G06F 21/6281 713/1 |
| 7,523,231 B1 | 4/2009 | Gupta et al. | | |
| 8,082,330 B1 | 12/2011 | Castelli et al. | | |
| 8,533,604 B1 | 9/2013 | Parenti et al. | | |
| 8,725,767 B1 | 5/2014 | Wood et al. | | |
| 9,519,425 B1 | 12/2016 | Wood et al. | | |
| 2008/0250043 A1* | 10/2008 | Sato | ............. | G11B 27/105 |
| 2010/0205559 A1* | 8/2010 | Rose | ............. | G06F 3/0482 715/781 |
| 2014/0201681 A1* | 7/2014 | Mahaffey | ......... | H04M 1/72569 715/846 |
| 2014/0365895 A1* | 12/2014 | Magahern | ........... | G06F 3/016 715/727 |
| 2015/0181531 A1* | 6/2015 | Zajac | ............. | G06F 1/3212 455/574 |

* cited by examiner

*Primary Examiner* — Mandrita Brahmachari
(74) *Attorney, Agent, or Firm* — Muirhead and Saturnelli, LLC

(57) ABSTRACT

Described are techniques for rendering a user interface display of an application. Inputs are provided to a mapping engine. The inputs may include environmental inputs, profiles (including customized user maps), capabilities, storage management patterns or maps, and historical data. The mapping engine determines, in accordance with the inputs, a set of operations relevant to a user that interacts with a user interface of the application at a current point in time. The set of operations may define a subset of functionality of the application customized for the user. A set of user interface elements may be rendered where the user interface elements rendered correspond to the set of operations relevant to the user.

19 Claims, 17 Drawing Sheets

TECHNIQUES FOR RENDERING USER INTERFACE DISPLAYS

BACKGROUND

Technical Field

This application generally relates to user interfaces.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Management software may be used in connection with management of data storage systems. The management software, as well as more generally any software, may obtain inputs used in connection with performing an operation or task. For example, user inputs may be obtained using a user interface. The management software may be characterized as a client which issues requests to a server, such as a data storage system, in connection with performing requested operations.

SUMMARY OF THE INVENTION

In accordance with one aspect of the invention is a method of rendering a user interface display of an application comprising: providing a plurality of inputs to a mapping engine; determining, by the mapping engine in accordance with the plurality of inputs, a set of one or more operations relevant to a user that interacts with a user interface of the application at a current point in time, wherein the set of one or more operations defines a subset of functionality of the application customized for the user; and rendering a set of one or more user interface elements corresponding to the set of one or more operations relevant to the user. The set of one or more operations may include a plurality of operations and the set of one or more user interface elements may include a plurality of user interface elements, and the method may include determining a ranking of the plurality of operations, said ranking denoting any of a relative usefulness of each of the plurality of operations to the user and an expected likelihood that the user will perform each of the plurality of operations. The ranking may be in accordance with the plurality of inputs including any of environmental inputs, profiles, capabilities of a system being managed using the application, predetermined management patterns of related application operations, and historical data. The plurality of inputs may include one or more factors regarding any of observed user activity and interactions of the user with the user interface. The one or more factors may include which of the plurality of operations have been previously performed by the user. The one or more factors may include a frequency that each of the plurality of operations has been performed by the user within a defined time period prior to the current point in time. The one or more factors may include which one or more of the plurality of operations has been performed by the user within a defined time period prior to the current point in time. The one or more factors may include whether a time of day when each of the plurality of operations has been performed previously matches a current time of day associated with the current point in time. The one or more factors may include whether a day of a week when each of the plurality of operations has been performed previously matches a current day of a week denoted by the current point in time. A first of the plurality of operations may have a highest position in the ranking thereby denoting the first operation is ranked as having any of a highest level of usefulness to the user and highest expected likelihood of selection by the user, and the first operation may be associated with a first of the plurality of user interface elements. The method may include varying one or more attributes affecting visual display characteristics of the first user interface element whereby the first user interface element, when rendered, is visually more prominent than any other of the plurality of operations ranked lower than the first operation.

The first user interface element may have a larger size than a second user interface element associated with a second of the plurality of operations ranked lower than the first operation. The first user interface element may be darker in appearance than a second user interface element associated with a second of the plurality of operations ranked lower than the first operation. The application may be a data storage management application. The set of one or more operations may include storage management operations.

In accordance with another aspect of the invention is a system comprising: a processor; and a memory comprising code stored therein that, when executed, performs a method of rendering a user interface display of an application comprising: providing a plurality of inputs to a mapping engine; determining, by the mapping engine in accordance with the plurality of inputs, a set of one or more operations relevant to a user that interacts with a user interface of the application at a current point in time, wherein the set of one or more operations defines a subset of functionality of the application customized for the user; and rendering a set of one or more user interface elements corresponding to the set of one or more operations relevant to the user.

In accordance with another aspect of the invention is a computer readable medium comprising code stored thereon that, when executed, performs a method of rendering a user interface display of an application comprising: providing a plurality of inputs to a mapping engine; determining, by the mapping engine in accordance with the plurality of inputs, a set of one or more operations relevant to a user that interacts with a user interface of the application at a current point in time, wherein the set of one or more operations defines a subset of functionality of the application customized for the user; and rendering a set of one or more user interface elements corresponding to the set of one or more operations relevant to the user. The set of one or more operations may include a plurality of operations and the set of one or more user interface elements may include a plurality of user interface elements, and the method may include determining a ranking of the plurality of operations, said ranking denoting any of a relative usefulness of each of the plurality of operations to the user and an expected likelihood that the user will perform each of the plurality of operations. The ranking may be in accordance with the plurality of inputs including any of environmental inputs, profiles, capabilities of a system being managed using the application, predetermined management patterns of related application operations, and historical data.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF
EMBODIMENT(S)

Figure 1:
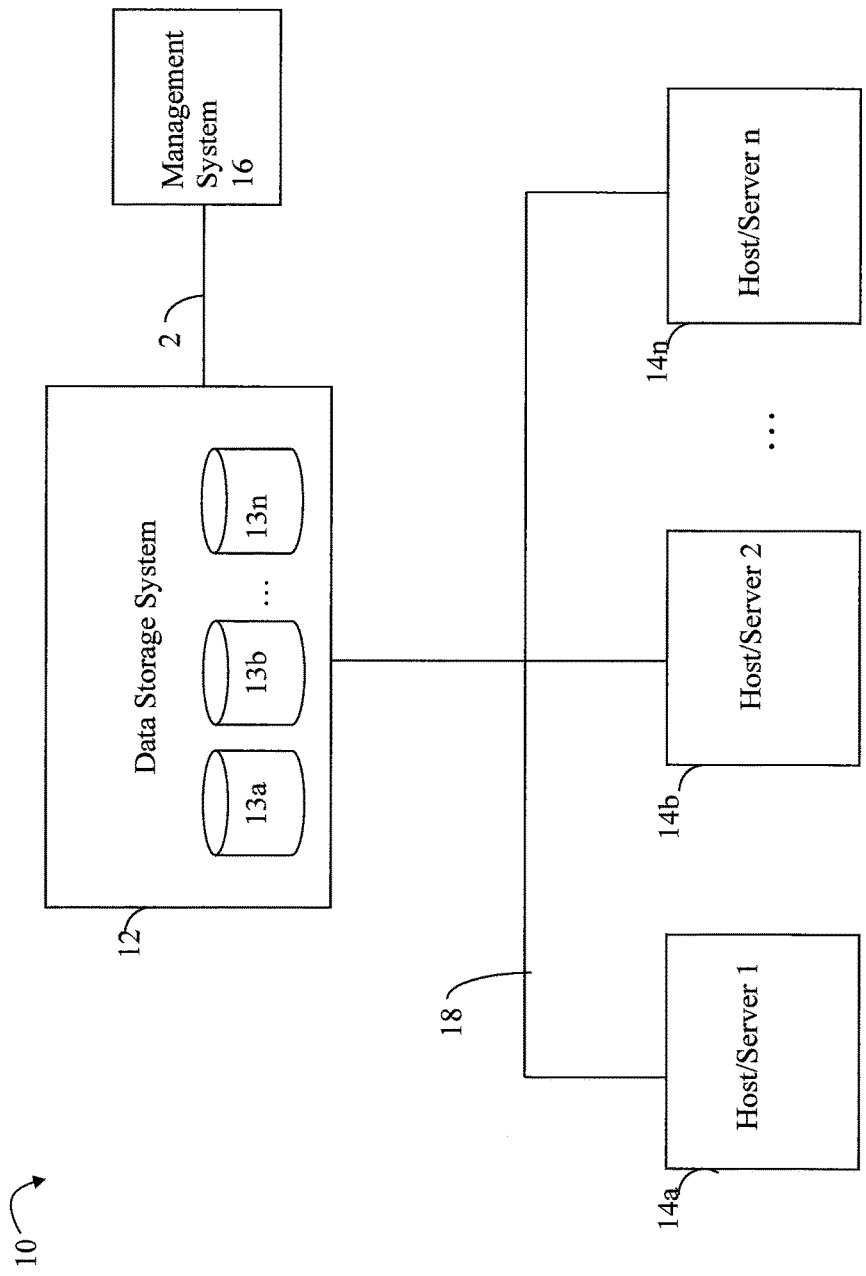
FIG. 1 is an example of an embodiments of a system that may utilize the techniques described herein.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 2. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 2 may be a LAN connection and the communication medium 18 may be an iSCSI or fibre channel (FC) connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices, such as switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 13a-13n, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

Figure 2:
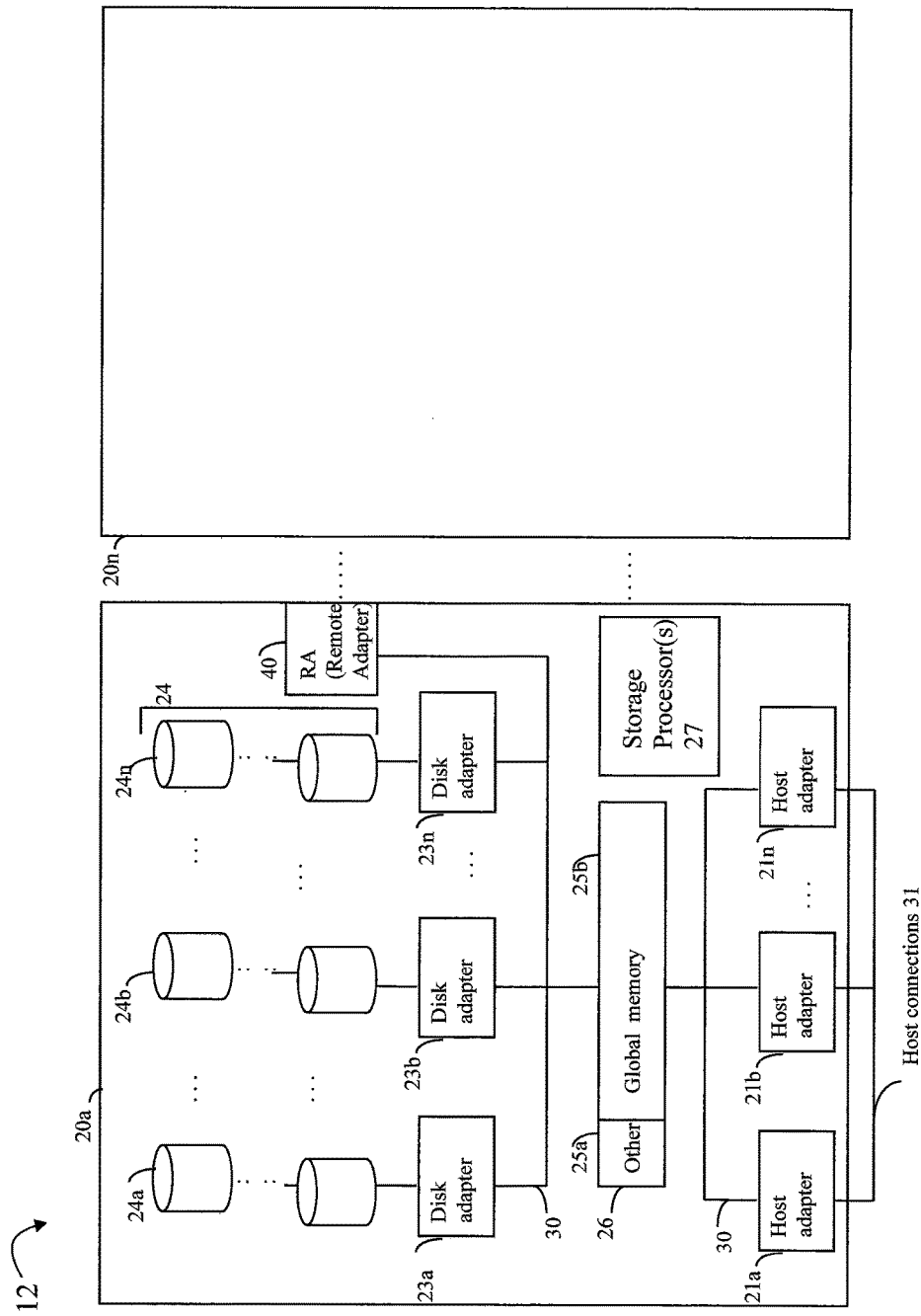
FIG. 2 is an example illustrating details of a data storage system in accordance with techniques herein.

Referring to FIG. 2, shown is an example of an embodiment of the data storage system 12 that may be included in the system 10 of FIG. 1. Included in the data storage system 12 of FIG. 2 are one or more data storage systems 20a-20n as may be manufactured by one or more different vendors. Each of the data storage systems 20a-20n may be a data storage array inter-connected (not shown) to other data storage array(s). Additionally, as noted above, the data storage systems may also be connected to the host systems through any one or more communication connections 31. In this example as described in more detail in following paragraphs, reference is made to the more detailed view of element 20a. It should be noted that a similar more detailed description may also apply to any one or more of the other elements, such as 20n, but have been omitted for simplicity of explanation.

Each of the data storage systems, such as 20a, may include a plurality of storage devices such as disk devices or volumes included in an arrangement 24 consisting of n groups of disks or more generally, data storage devices, 24a-24n. In this arrangement, each group of disks may be connected to a disk adapter ("DA") or director responsible for the backend management of operations to and from a portion of the disks 24. In the system 20a, a single DA, such as 23a, may be responsible for the management of a group of disks, such as row 24a. In a data storage system such as by EMC Corporation, a backend DA may also be referred to as a disk controller. The DA may performed operations such as reading data from, and writing data to, the physical devices which are serviced by the DA.

Also shown in the storage system 20a is an RA or remote adapter 40. The RA may be hardware including a processor used to facilitate communication between data storage systems, such as between two of the same or different types of data storage systems.

The system 20a may also include one or more storage processors 27. Each of the storage processors 27 may be CPU and an embodiment may include any number of such processors. For example, the VNX® data storage system by EMC Corporation includes two storage processors. The system 20a may also include one or more host adapters ("HAs") or directors 21a-21n. Each of the HAs may be used to manage communications and data operations between one or more host systems and the global memory. In an embodiment, the HA may be a Fibre Channel Adapter (FA) or other adapter which facilitates host communication. The HA communicates with a component of the host such as a host bus adapter (HBA). Generally, directors may also be characterized as the different adapters, such as HAs (including FAs), DAs RAs and the like, as described herein. Components of the data storage system, such as an HA, which may communicate with a host may also be referred to as front end components. Within the data storage system, components, which may be characterized as backend components, communicate with a front end component. An example of a backend component is a DA. In connection with data storage systems such as by EMC Corporation, various types of directors or adapters may be implemented as a processor, or, more generally, a component that includes the processor. Examples of directors are disk adapters (DAs), host adapters (HAs), and the like.

One or more internal logical communication paths may exist between the DAs, the RAs, the HAs, and the memory 26. An embodiment, for example, may use one or more internal busses or other internal connections 30 and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in FIG. 1 is a management system 16 that may be used to manage and monitor the system 12. In one embodiment, the management system 16 may be a computer system which includes data storage system management software such as may execute in a web browser. A data storage system manager may, for example, view information about a current data storage configuration such as LUNs, storage pools, and the like, on a user interface (UI) in display device of the management system 16.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as the VNXe® data storage system by EMC Corporation of Hopkinton, Mass., that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

As noted above, management software may be used in connection with management of data storage systems. The management software, as well as more generally any software, may obtain inputs used in connection with performing an operation or task. The management software may be characterized as a client which issues requests to a server, such as a data storage system, in connection with performing requested operations. In one embodiment, the data storage system management software, as a client, may execute on a computer system which communicates with the data storage system that services data storage system management requests from the client. More generally, the data storage system management software may execute on any suitable processor including a processor of the data storage system as well as another system or component. For example, the management software may execute on the data storage system and/or management system 16. A client, such as a user interface (UI) of the data storage system management software included in the management system 16, may be used by an administrator in connection with performing data storage management operations. For example, the administrator may view information using a graphical UI (GUI) regarding the current data storage configuration, may perform an operation such as create or configure a logical entity such as a RAID group, LUN, storage group (SG) of one or more LUNs, and the like. A logical entity such as a RAID group may be represented by an object having attributes such as indicating a RAID level of the RAID group (e.g., RAID-0, 1, 5, or 6), a number of data and/or parity drives, and the like.

During operation of the data storage system management application, its GUI may issue a command request such as in the form of an API call to the data storage system to service the command request. In response to receiving the request, the data storage system may perform processing to service the request and return a response such as, for example, including any requested data storage system configuration information.

The command request issued by the GUI may be, for example, to view information regarding logical and/or physical data storage system entities of the data storage configuration (e.g., list physical storage devices and associated properties and statuses, list logical storage entities such as logical devices having storage provisioned on physical storage devices, list properties of such logical devices), perform an operation (e.g., create, delete, modify) with respect to a logical storage entity (e.g., logical storage device, storage group of one or more logical storage devices)) of the configuration, and the like. The data storage system may include, or otherwise have access to, a database, or more generally any suitable data container or data store, comprising the data storage system configuration information. The data storage system configuration information may describe the current configuration of the data storage system. The data storage system configuration information may include an object model representation of the different physical and logical entities in the data storage system. For example, the configuration information may include objects representing current configuration and state of physical entities such as physical storage devices (e.g., disks, solid state storage devices), power supplies, and the like. The configuration information may also include objects representing current configuration and state of logical entities such as RAID groups and/or storage pools (e.g., configured logical groupings of physical storage devices), LUNs having physical storage configured from such RAID groups and/or storage pools, storage groups (e.g., logical groupings of one or more LUNs), and the like.

In this manner, the data storage system as a server may service a request from the GUI of the data storage system management software such as by retrieving requested data from the data storage system configuration information database in connection with a request to get or read configuration information. Servicing performed by the data storage system may also include creating, updating and/or otherwise generally modifying the data storage system configuration information database in connection with a request, for example, to provision storage for a new LUN, create a new storage group, add new physical storage devices to the system and therefore create corresponding new objects in the database, and the like.

In connection with a GUI such as of the data storage system management application, various UI elements or components, or more generally, UI content, may be displayed. UI elements may include, for example, a menu, a menu bar, a menu item (e.g., one or more selected menu items from a menu), a text box, a button (e.g., radio button, cycle button), a wizard, a navigation section including one or more hyperlinks, a table, a form, one or more fields of the form, a drop-down list, a list box, a check box, a dialog box, a combo box, and the like. A software wizard is a UI type that presents a user with a sequence of dialog boxes that lead the user through a series of well-defined steps. A text box may be a box in which to enter text or numbers. A hyperlink may be displayed as text with some visual indicator (such as underlining and/or color) indicating that selecting the link will result in linking or displaying another screen or page. Properties of a hyperlink may relate to whether the hyperlink is enabled, disabled or hidden. If enabled, the particular path or location identifying a website or the web page may be displayed in response to selection of the hyperlink. A drop-down list may be a list of items from which to select. The list normally only displays items when a special button or indicator is selected. A list box allows a user to select one or more items from a list contained within a static, multiple line text box. A combo-box may be a combination of a drop-down list or list box and a single-line textbox, allowing the user to either type a value directly into the control or choose from the list of existing options. A check box indicates an "on" or "off" state via a check mark ☑ or a cross ☒. A radio button is similar to a check-box, except that only one item in a group can be selected. Its name comes from the mechanical push-button group on a car radio receiver. Selecting a new item from the group's buttons also deselects the previously selected button. A cycle button is a type of button that cycles its content through two or more values, thus enabling selection of one from a group of items. A table may also be referred to as a grid in which numbers and/or text may be displayed in rows and columns. The foregoing are some examples of UI elements that may be used in an embodiment in accordance with techniques herein which may be enabled, disabled, hidden, displayed with varying visual properties (e.g., opacity or boldness, size, location on the display or window, and the like) in a UI display. UI content that is disabled may be visible yet non-functional in the sense that any controls or interactions with the user are disabled or inactive. Disabled UI content may be displayed in a UI and visually denoted as disabled such as by greying out the disabled UI content. Hidden UI content is not visible on the UI display.

Although examples and references herein may be made with respect to a GUI of an application for data storage management, more generally, the techniques herein may be used in connection with any suitable user interface (UI) for any application.

Mind mapping may be generally characterized as a technique that models a human's thought process that is based on associative thinking. Typically, a person's thoughts go from one idea, such as a task or action, to another related idea. The relation between the ideas is particular to the person. A "network" of ideas may result that is the product of many associated ideas that may be formed from one initial idea. Described in following paragraphs are examples of applying mind mapping techniques to storage management software, or more generally, to any management software. Typically, management software presents the user with a full range of features and options. In most cases, the user utilizes only a portion of the full set of features for the daily tasks. Moreover, the user must follow the workflow or procedure predefined by the software designers in the management software application rather than an alternate workflow that the user may desire. In accordance with techniques herein, an embodiment may not present all features of the management application to the user via the GUI. Rather, an embodiment in accordance with techniques herein may present a user initially with high level categories of operations that can be performed. Upon selection of a particular category, a slightly more specific set of operations may be presented, and so on. As the user the traverses the options, a map may be built for the particular user of those options so that it is repeatable. If the user needs to perform another set of tasks, another map can be built similarly. In an embodiment in accordance with techniques herein, the result effect is that the user has built a "custom" application as denoted by a customized map for the user's particular purposes. The user may therefore not be presented with UI elements, content, and the like, of the application that does not concern the user. For example, as described in more detail in following paragraphs, a security administrator is typically not interested in provisioning storage or providing storage access to hosts. However, the user may be interested in granting and reviewing user access to the storage. As such, techniques herein may be utilized to build a customized map for the user that includes tasks the user typically performs such as, for example, tasks to give user permissions, review audit logs, generate access reports, and the like. Whenever a user who is the security administrator uses the management software, the user may be presented only with the security administration map customized for his/her particular usage. Providing such a map for a user reduces amount of information presented and further customizes the particular information and functionality of the application presented in the GUI for the particular user.

Figure 2B:
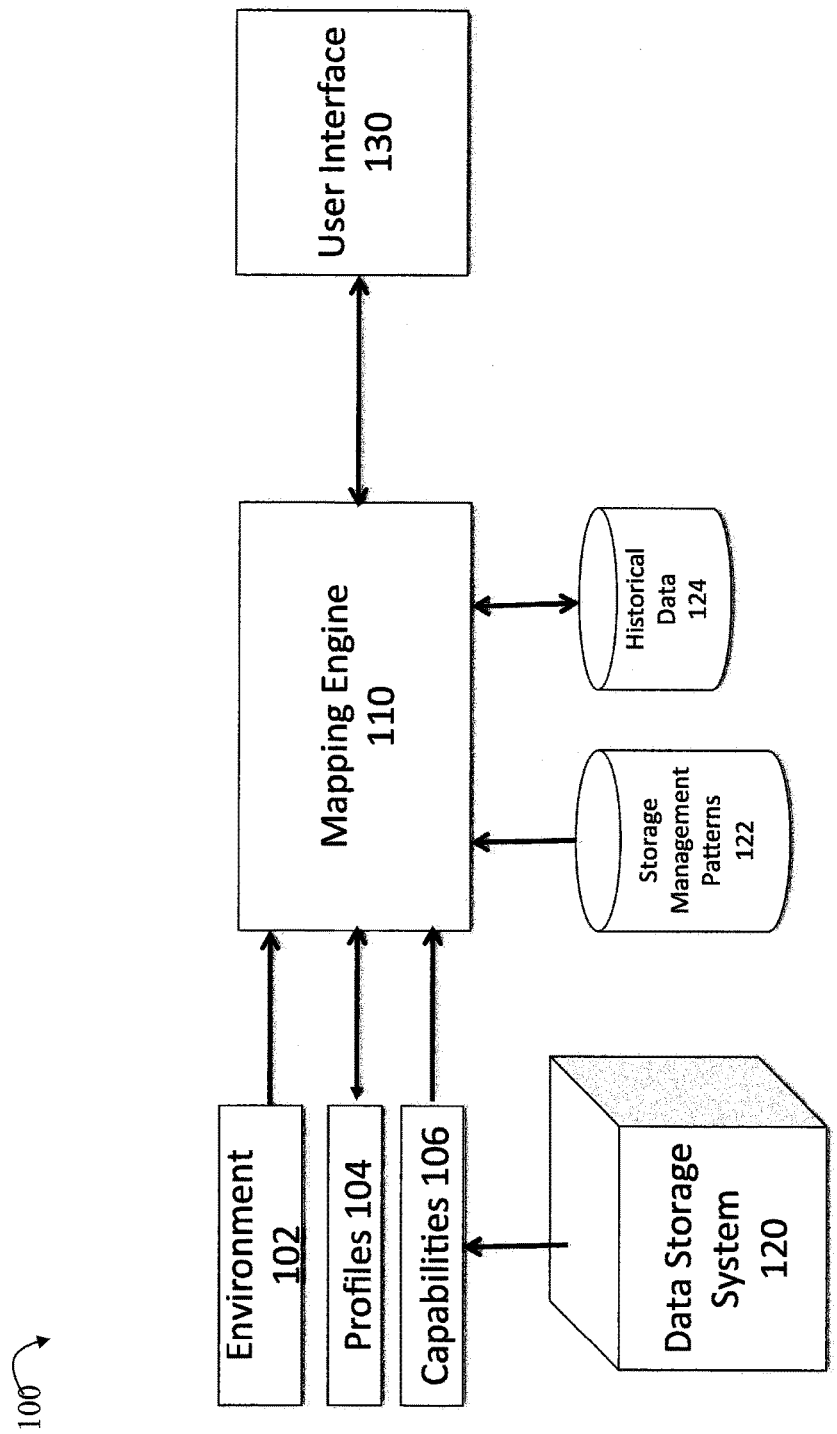
FIG. 2B is an example of components that may be included in an embodiment in accordance with techniques herein.

Referring to FIG. 2B, shown is an example of a components that may be included in an embodiment of a system using techniques herein. The example 100 includes mapping engine 110 that may be a software application written in any programming language, scripting language, and the like. The mapping engine 110 may receive inputs including environment inputs 102, profiles 104, capabilities 106, storage management patterns 122, and historical data 124. From the foregoing inputs, the mapping engine 110 may determine what UI elements are included in the displayed GUI at a point in time, determine various visual aspects of displayed UI elements presenting application functionality, and the like. Thus, the mapping engine 110 may interact with the user interface (UI) 130 and provide such information including the particular UI elements to be presented in a UI display to a user at a point in time. The UI 130 may be the UI of the management application as described elsewhere herein. The mapping engine 110 may also update historical data 124 and profiles 104 as described in more detail in following paragraphs.

Environmental inputs 102 provided to the mapping engine 110 may relate to current user environmental conditions. For example, environmental inputs 102 may include information regarding various user interactions in the current session, such as user selections, user inputs, particular operations or tasks performed by the user, and the like. Environmental inputs 102 may include the current time of day and current day of the week when the user is interacting in a current session with the UI 130. Environmental inputs 102 may also include the particular role or roles assigned to a user. Roles are described in more detail elsewhere herein. A user role may limit functionality presented to a user since a user having assigned a particular role may only be allowed to perform a set of tasks or operations associated with the assigned role.

Profiles 104 may include user specific workflows customized for particular users of the application. For example, a first profile may include customized workflows and functionality used by a first user who is a data storage administrator typically performing a first set of data storage administration tasks related to user account creation and management, granting/providing access of storage to users, and the like. A second user may be an operator who has less privileges that the foregoing administrator and also typically performs only storage provisioning. The second user may never perform any account management activities. Thus, a second profile customized for the second user may not include any tasks related to user account creation and management. Additionally, since the second user typically only performs storage provisioning, the second profile for the second user may include UI elements for other tasks the operator may have privileges to perform. However, such other tasks may have associated UI elements that are visually displayed in a less prominent and conspicuous manner than any UI elements for storage provisioning as may be indicated by the second profile. Thus, as a user interacts more with the UI 130, the mapping engine 110 may also accordingly update information in the user's customized profile as described in more detail in following paragraphs.

The profiles 104 may also include default profiles that may be used to initialize a particular user's profile. For example, a set of default profiles may exists including workflows for particular operations and tasks performed based on roles that may be assigned to users. Roles may include, for example, a data storage administrator, an operator, a security administrator, and the like. The data storage administrator role may have privileges to perform any and all operations and tasks on a system. The security administrator role may be a particular type of administrator and able to perform a subset of the general data storage administrator operations and tasks related to security. The operator role may have a limited set of privileges and may therefore only be able to perform a limited set of data storage operations and tasks. The operator role may not be allowed to perform an account tasks and may typically perform storage provisioning tasks. Thus, the profiles 104 may include a set of default workflows of tasks, operations, and the like, typically performed by a user assigned one of the foregoing roles. In this manner, when creating a new user account, one option may be to select one of the default profiles that is then used to initialize a particular new user's profile. Additionally, a first profile for a first user may also be generally used to initialize a second profile for another second user. The second profile may then be further customized or adapted over time for the second user based on the second user's subsequent UI interactions.

The capabilities 106 may relate to the current state of the data storage system 120. Such state may limit the functions and operations that are capable of being performed with respect to the data storage system at a point in time. For example, the data storage system may be in a degraded state where the system has limited functional capabilities and a user may not be able to perform certain operations such as provision storage when the data storage system is in the degraded state. As another example, network connections to certain systems may be down. A network connection with a remote data storage system may be down and any operations related to remote mirroring, and the like, requiring the connection to the remote data storage system may be disabled. Thus, depending on the particular data storage system state, certain operations or tasks may be disabled.

Historical data 124 may relate to usage or user interactions as may be recorded or observed over time by the mapping engine 110. Such historical data 124 may denote usage patterns of particular users over time such as, for example, when certain UI elements and associated operations are performed by particular users (e.g., the time of day, day of week and the like, when particular UI elements and associated operations are performed by different users over time), frequency with which a particular user performs an operation or task or selects a UI element, and the like.

Storage management patterns 122 may be a database or other data container including one or more sets of predefined related ideas. Thus, storage management patterns 122 may include a default set of maps of related functions, tasks, ideas, items, and the like, that may be used in an embodiment in accordance with techniques herein. The patterns 122 may be a set of predefined related or associated ideas that may be customized for use with a particular user based on user-specific factors described herein (e.g., user interactions over time, user role, time of day, and the like).

Figure 3:
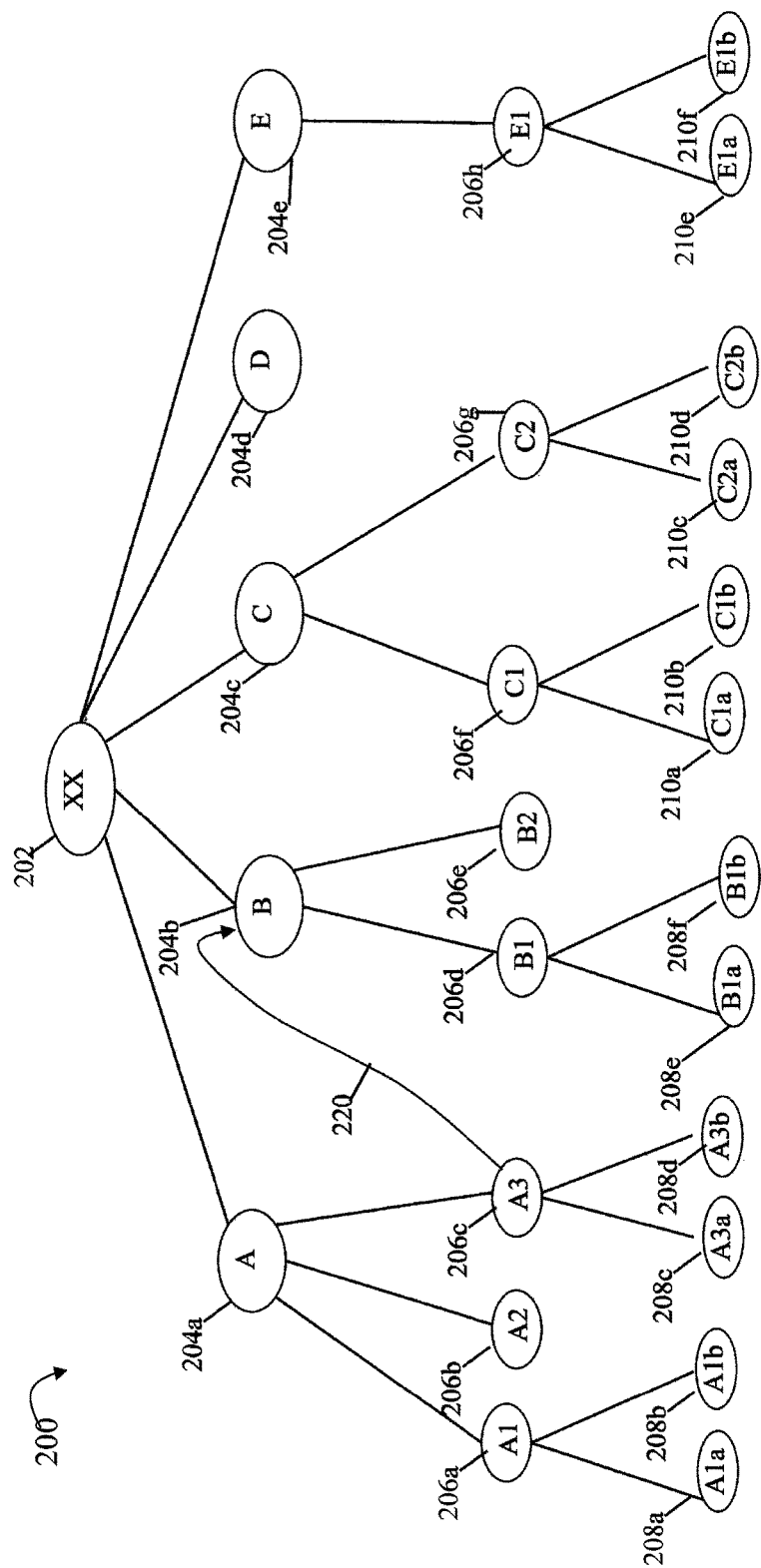
FIGS. 3, 4, 5A, 5B, 10 and 11 are examples of maps that may be used in an embodiment in accordance with techniques herein.

For example, reference is made to FIG. 3 illustrating a representation of one of the maps of predefined associated items that may be used in an embodiment in accordance with techniques herein. The example 200 illustrates information that may be included in a predefined structure of related items. In this example, circles denote nodes or states in an application workflow such as related UI elements for tasks or actions that may be performed. Relationships or associations between two nodes is represented by an interconnecting line there between. This example forms a tree-like hierarchical structure although a map does not have to have such a structure. In this example 200, nodes 202, 204*a-e*, 206*a-h*, 208*a-f* and 210*a-f* denote states each corresponding to an action or task that may be performed. A line connecting any two nodes denotes a valid state transition such as may be represented in the GUI. For example, nodes 204*a-e* may denote 5 current UI elements displayed at a first point in time. Upon selecting the UI element for node 204*a*, the UI display may be updated to include UI elements for options 206*a-c* that are then selectable. In this example 200, although not explicitly illustrated using line connections between nodes, valid states transitions may flow downward from the top level. Node 202 may be at level 1, the top level. Level 2 may include notes 204*a-e*. Level 3 may include nodes 206*a-h*. Level 4 may include nodes 208*a-f* and 210*a-f*. A line connecting a first node at level N to a second node at level N+1 denotes a valid transitions are from the first to the second node. It should be noted that element 220 denotes one additional valid transition represented with a directional arrow from node A3 206*c* to node B 204*b*.

Figure 4:
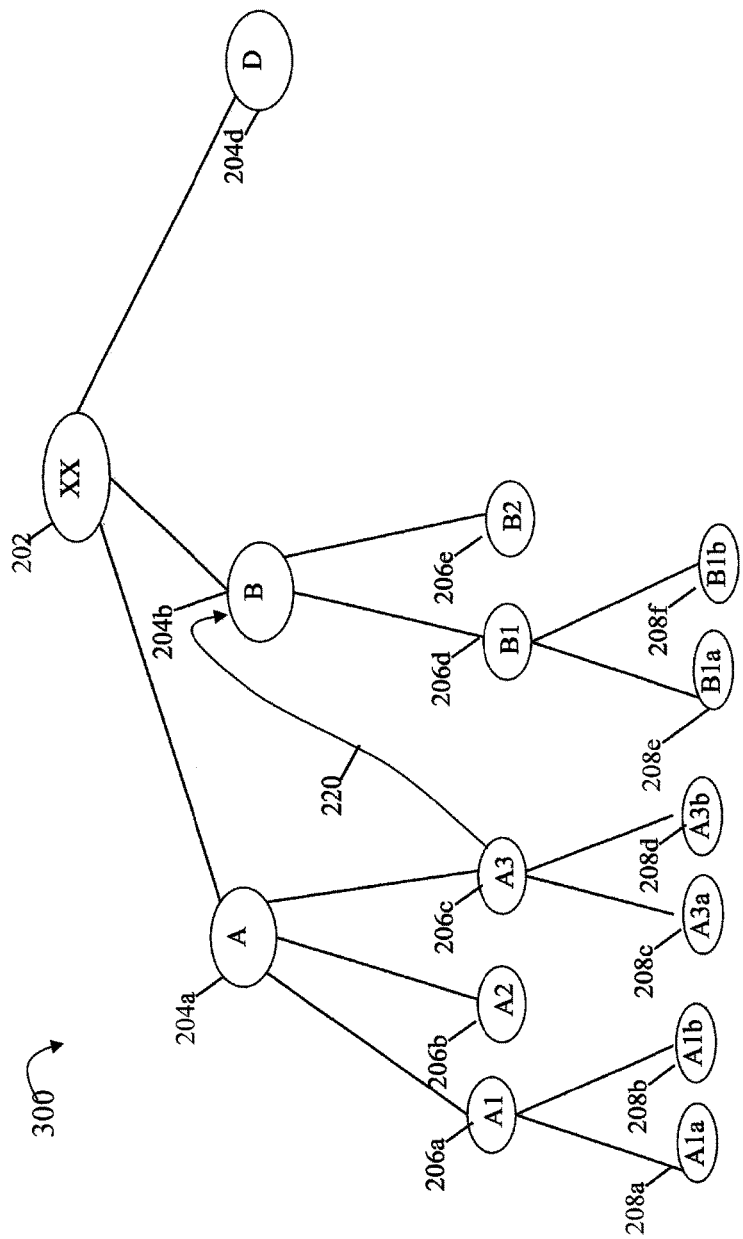

The information in the example 200 may be represented in a data structure stored in the storage management patterns database 122 denoting all relates functions, tasks, and the like, for a particular initial idea, function or task represented by node XX 202. For example, as described in more detail in following paragraphs and example, the example 200 may denote a first map of all tasks or options available in the management application for an initial idea, function or task of provisioning storage as represented by node 202. The structure of 200 may include all related options, functionality and service in the management application such as remote mirroring, backup, encryption, granting access to user and hosts, and the like. Thus, a user may be initially presented with all options and functionality corresponding to nodes 204*a-e*. In subsequent various sessions, the user may then only ever perform management actions or tasks associated with nodes A 204*a*, B 204*b* and D 204*d*. The user may never perform actions or tasks associated with nodes C 204*c* and E 204*e*. Thus, over time, the map of FIG. 3 may be further customized for the particular user as illustrated in the example 300 of FIG. 4. In the example 300, it may be seen that the map 300 has been pruned to remove nodes 204*c* and 204*e* and associated connections (e.g., nodes 204*c*, 206*f-g*, 210*a-d* have been removed and nodes 204*a*, 206*h* and 210*e-f* have been removed). An embodiment may store the modified or customized map as illustrated in FIG. 4 for the particular user described above. In this case, for the user, a UI display may include UI elements for actions or tasks denoted by 204*a*, 204*b* and 204*d* rather than for nodes 204*a-e*.

Additionally, for the user, an embodiment may vary the visual presentation in the UI display of the UI elements for 204*a*, 204*b* and 204*d*. For example, the UI display may determine a relative ranking of importance, relevance, or expected usage/selection of the UI elements for 204*a*, 204*b* and 204*d* at the time of display. For example, the top ranked 2 UI elements may be displayed with visual attributes making them more prominent in the UI display than other UI elements of the display. Such visual attributes may relate to any of size of the UI element, opacity (e.g., shading or darkness) of the UI element, color, and the like. For example, the top ranked 2 UI elements may have a relative size that is larger and also darker in color than other displayed UI elements. This is further illustrated and described in more detail elsewhere herein. Such a relative ranking of UI elements may be based on a weighting of one or more factors based generally on the inputs 102, 104, 106, 122 and 124 provided to the mapping engine 110 as illustrated in FIG. 2B. The one or more factors may include, for example, frequency of selection or frequency of performing the associated action of each UI element within a defined previous time window, recent usage history (e.g., the UI element most recently selected within some prior period of time may be ranked higher than others or weighted more heavily than those UI elements which have not been so recently selected), time of day when previously selected and the current time of day when the UI is being displayed, day of week when previously selected and the current day of the week when the UI is being displayed, and the like. For example, every Friday between 3 and 5 p.m. for the last 2 months, a user may have selected a first UI element to perform a backup operation. Thus, if the current time is between 3 and 5 pm on a Friday afternoon, an embodiment in accordance with techniques herein may display the UI element denoting the backup operation as the largest and most visually prominent UI element in the display. The foregoing ranking determines relative importance or likelihood that a user may be expected to select a particular operation or task in the future based on prior user interactions including those reflected by the one or more factors.

The one or more factors may include capabilities (e.g., 106 of FIG. 2B) of the data storage system being managed. For example, as described elsewhere herein, capabilities may include information relating to the state of the data storage system. As a result, if the data storage system is currently incapable of performing a particular operation or task, a factor may be used in the weighting or ranking affecting the operation or task that cannot currently be performed. The ranking may include the operation or task having a visual or display attribute affected, such as greying out the UI element for the operation to denote the operation is disabled/not able to be performed. As a variation, the ranking may include the operation as a last or bottom ranked operation having an associated UI element that may be omitted from the UI display.

It should be noted that other figures presented herein that denote maps or workflow of patterns 122 and profiles 104 discussed in following paragraphs follow conventions similar to those as described in connection with FIGS. 3 and 4.

Figure 5A:
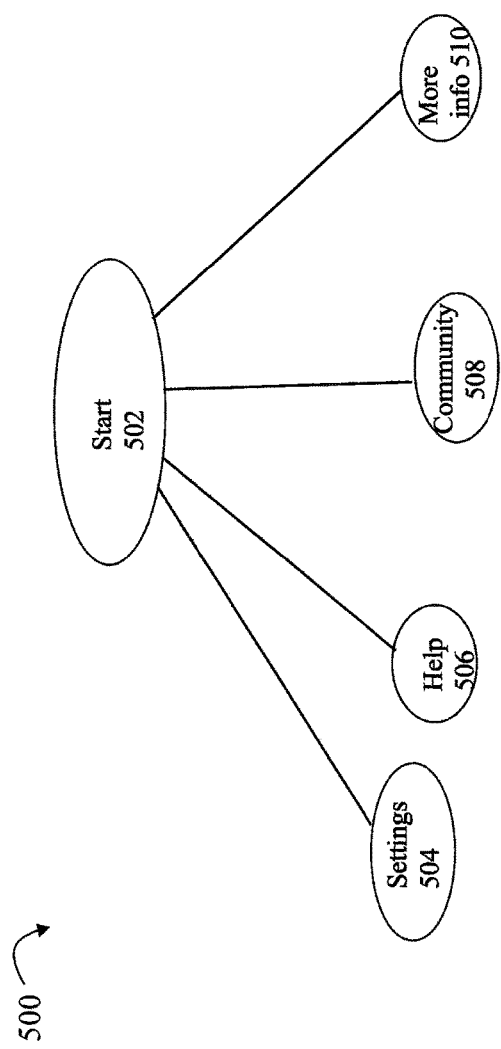

Referring to FIG. 5A, shown is a first map that may be included in a the storage management patterns 122 in an embodiment in accordance with techniques herein. The example 500 illustrates nodes for UI elements that may be presented on initial startup of the application to a user in an embodiment in accordance with techniques herein. As illustrated in FIG. 5A, the initial UI display may include 4 UI elements corresponding to nodes 504, 506, 508 and 510.

Node 504 may relate to operations performed to view and/or set different settings for the management application. Node 506 may relate to various help operations (e.g., searching for information in online resources). Node 508 may relate to operations to view and/or join various online communities for data storage management, generally related to data storage products and systems, and the like. Node 510 may relate to operations providing more information about the management application.

Figure 5B:
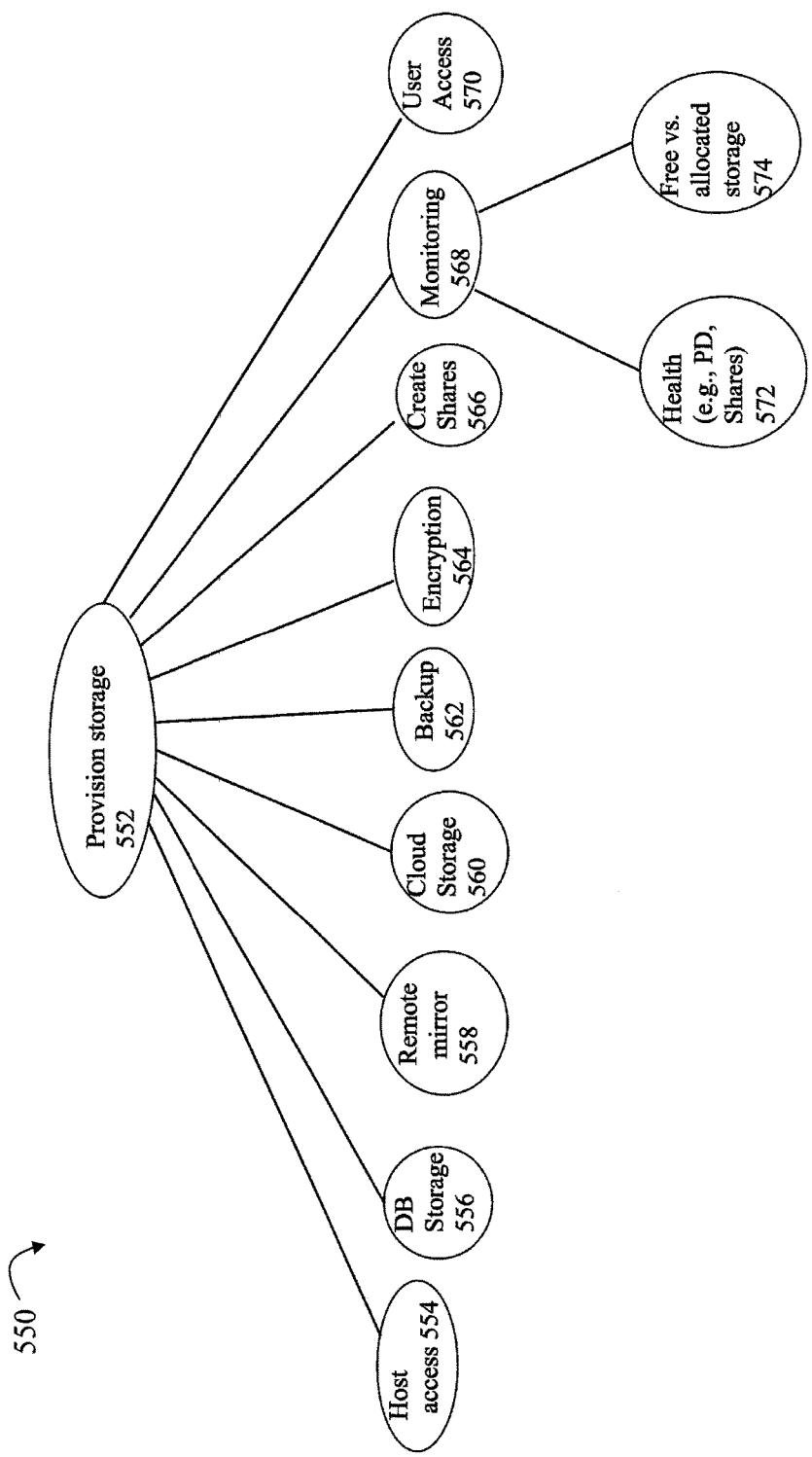

Referring to FIG. 5B, shown is a second map that may be included in a the storage management patterns 122 in an embodiment in accordance with techniques herein. The example 550 illustrates nodes for UI elements that may be presented to a user in connection with provisioning storage in an embodiment in accordance with techniques herein. As illustrated in FIG. 5B, the initial UI display for provisioning storage (as denoted by node 552) may include 9 UI elements corresponding to nodes 554, 556, 558, 560, 562, 564, 566, 568 and 570. Nodes 572 and 574 may be further options associated with monitoring task or function 568.

Node 554 may relate to operations perform to allow access to one or more hosts to provisioned storage. Node 556 may relate to operations performed to provision storage for a database. Node 558 may relate to setting up and performing remote mirroring of provisioned storage. Node 560 may relate to operations performed to provision cloud-based storage such as configuring a LUN. Node 562 may relate to setting up and performing backup operations of provisioned storage. Node 564 may relate to performing/enabling encryption of data stored on provisioned storage. Node 566 may relate to performing an operation to create new file shares. Node 568 may relate to various monitoring operations such as related to 572 the health of physical devices providing provisioned storage for file shares, logical devices, and the like and the amount of free or unused storage 574 (e.g., provision a LUN or file share to have X amount of capacity and may want to monitor how much of the provisioned storage is free or available for storing additional data at a point in time). Node 570 may relate to operations performed to provide users access to various provisioned storage such as file shares, databases, and logical devices.

Figure 6:
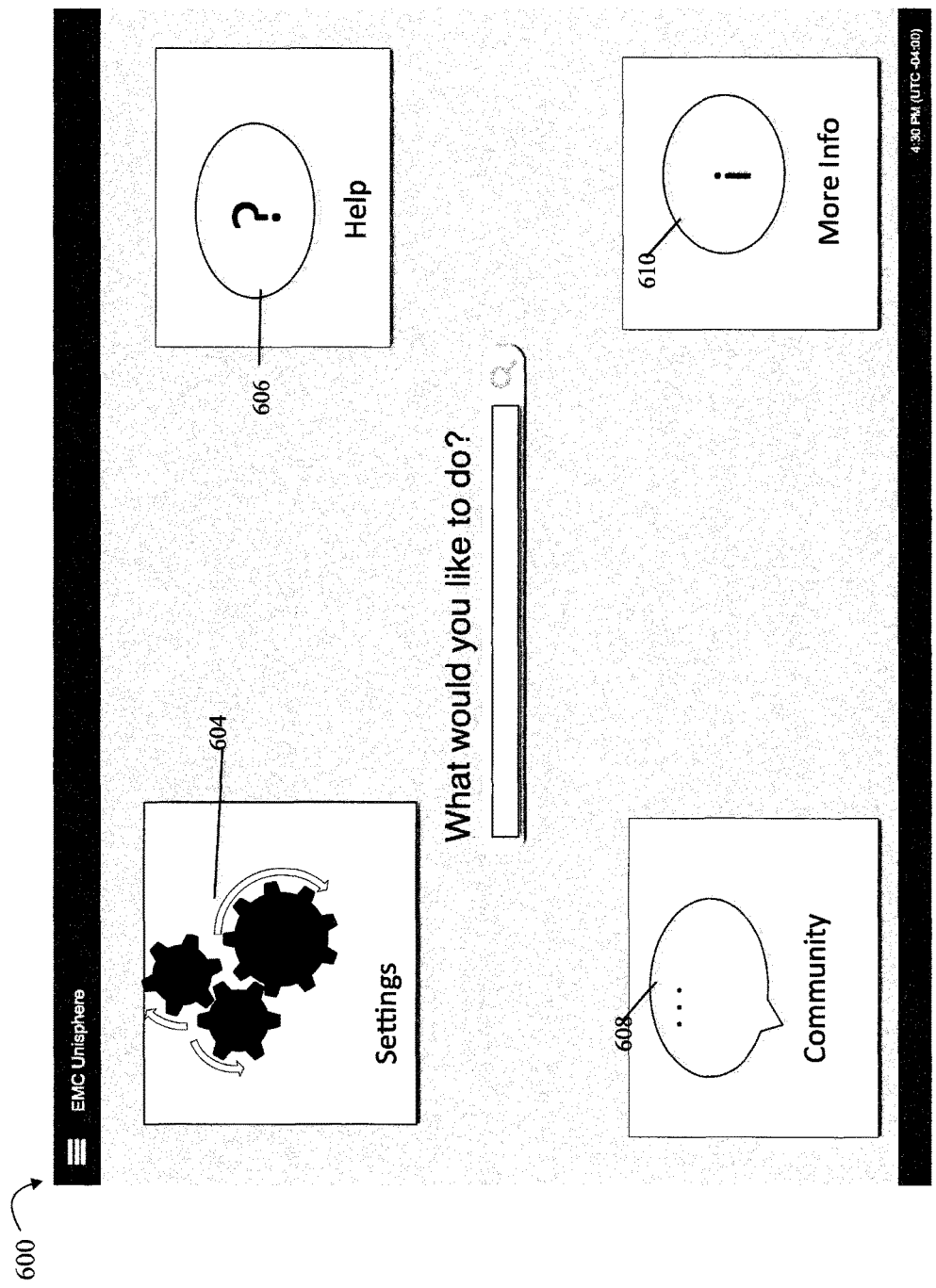
FIGS. 6, 7, 8, 9, 12, 13A and 13B are examples of user interface displays that may be rendered in an embodiment in accordance with techniques herein.

Referring to FIG. 6, shown is an example 600 illustrating a first UI display in an embodiment in accordance with techniques herein. The example 600 illustrates UI elements that may be displayed at a first point in time when the data storage system management application is initially started for a first user. The UI elements of FIG. 6 correspond to the nodes of the map 500 of FIG. 5A. In particular UI elements 604, 606, 608 and 610 of FIG. 6 correspond, respectively, to nodes 504, 506, 508 and 510 of FIG. 5A.

Figure 7:
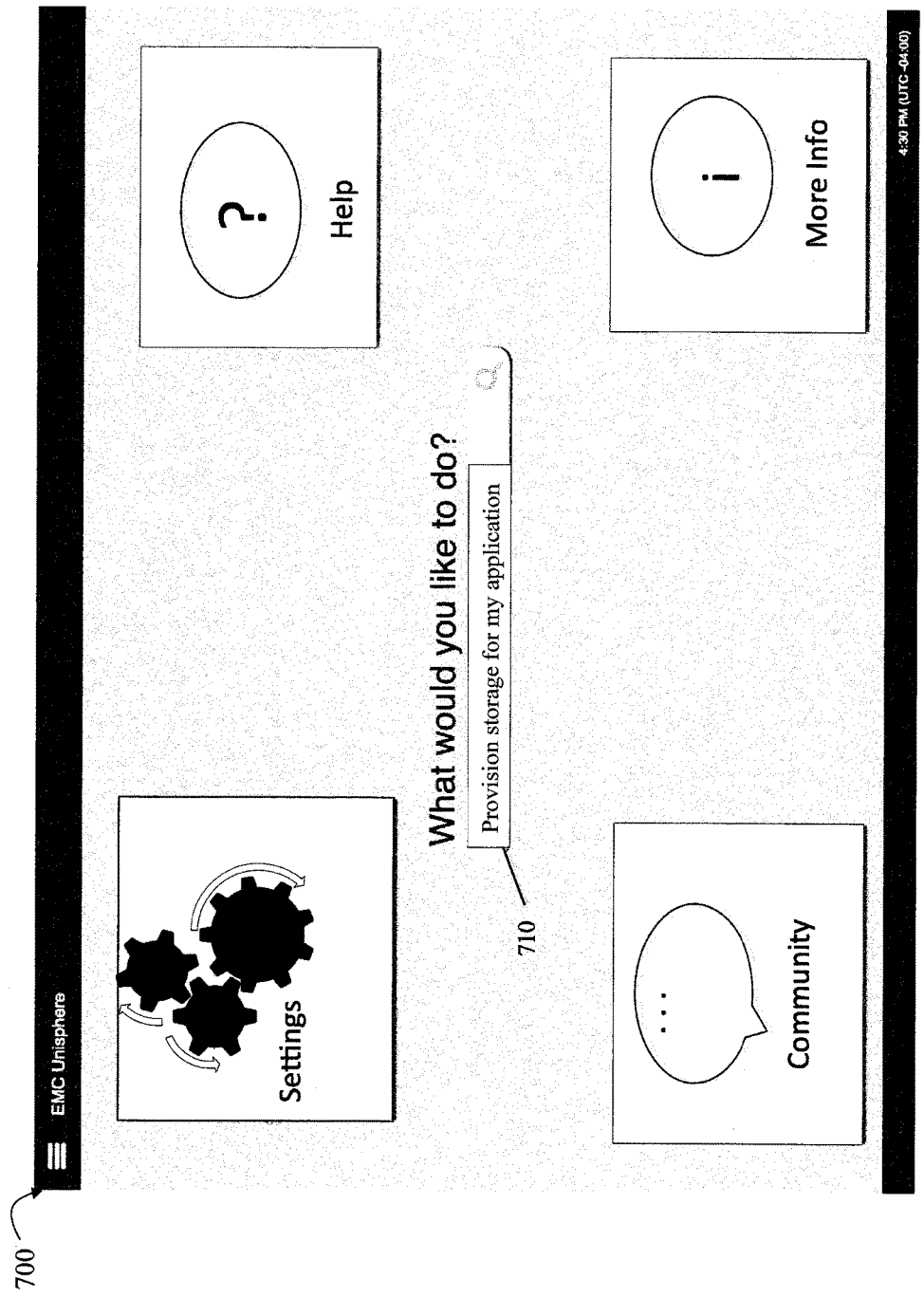

Referring to FIG. 7, shown is an example 700 illustrating a second UI display in an embodiment in accordance with techniques herein. The example 700 illustrates UI elements at a second point in time where the UI elements are as in FIG. 6 with the additional input entered by the user in line 710. As denoted by element 710, the user indicates to the GUI that he/she wants to provision storage for an application.

Figure 8:
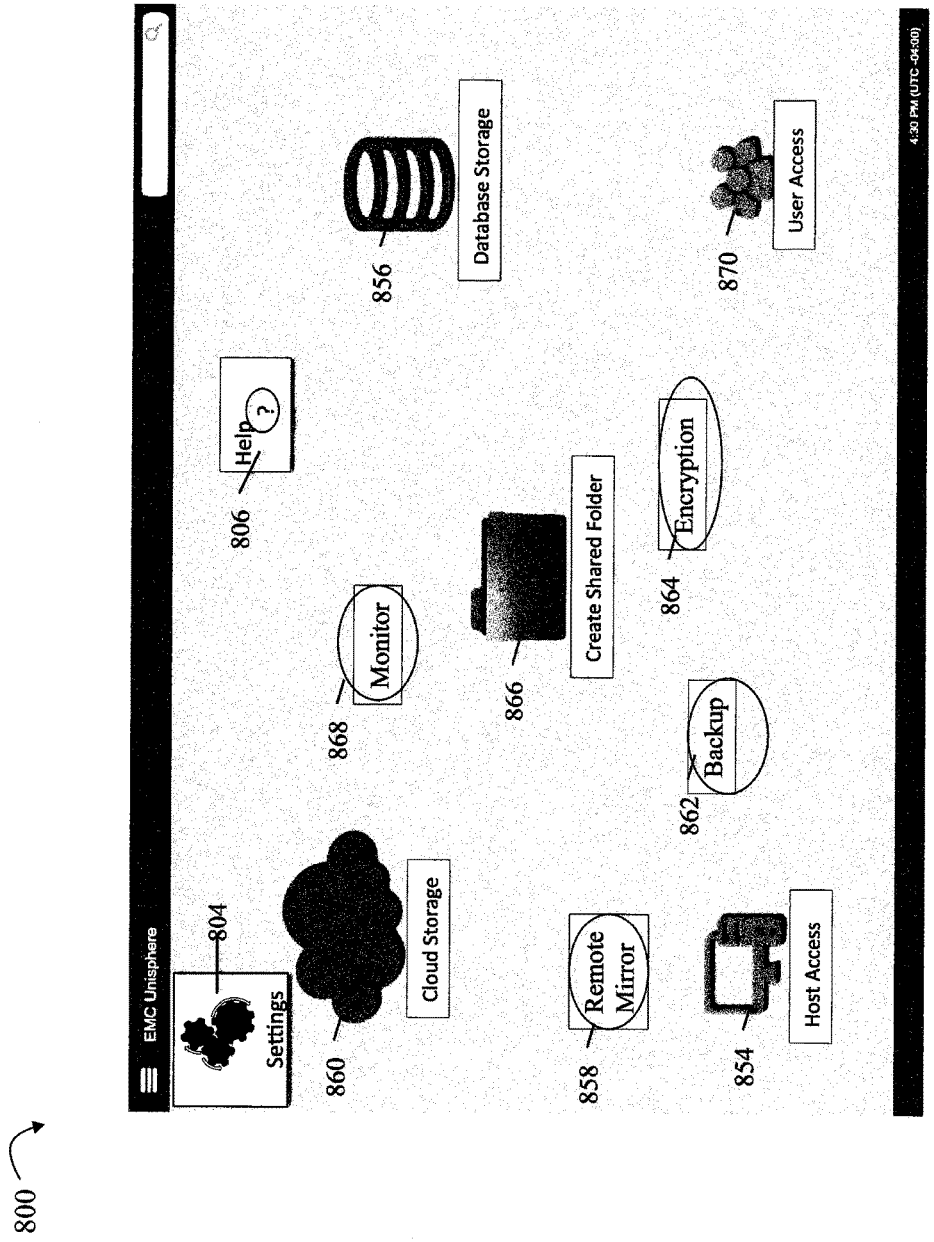

Responsive to entering the information on line 710, a third UI display as illustrated in FIG. 8 may be presented to the user at a third point in time in an embodiment in accordance with techniques herein. The example 800 of FIG. 8 illustrates UI elements that may be displayed in the third UI display based on the map 550 of FIG. 5B. In particular UI elements 854, 856, 858, 860, 862, 864, 866, 868 and 870 of FIG. 8 correspond, respectively, to nodes 554, 556, 558, 560, 562, 564, 566, 568 and 570 of FIG. 5B. Additionally, less relevant options corresponding to UI elements 604 and 606 of FIG. 6 have been visually modified to be less prominent, respectively, as denote by UI elements 804 and 806 of FIG. 8. Thus, as illustrated in FIG. 8, the engine may perform processing to add the information from map 550 of FIG. 5B to the UI display and also modify currently displayed UI elements 604, 606, 608 and 610 to remove 608 and 610 and visually reduce in significance UI elements 604 and 606. In this example, the elements 604 and 606 may be modified, for example, to be much smaller in size as illustrated by elements 804 and 806. Additionally, elements 804 and 806 may be more translucent or lighter in color and/or shading than, respectively, elements 604 and 606 of FIG. 6. The foregoing visual modifications to elements 604, 606, 608 and 610 are due to the decrease in importance in light of the user entering information on line 710 regarding the provisioning task.

The third UI display of FIG. 8 may be displayed to the user at the third point in time as noted above. After the third point in time, the user may perform various data storage system operations and tasks. In this example, the user may have a role of operator and the user may only perform a subset of the operations corresponding to UI elements of FIG. 8. Thus, over a period of time subsequent to the third point in time mentioned above, additional historical data regarding user interactions and selections may be recorded and used to further refine or customize the map of FIG. 5B for the user. For example, during a 2 month time period following the third point in time, assume the user does not perform any of the following operations: remote mirroring 858, encryption 864, and backup operations 862. However, the user does perform operations associated with provisioning cloud storage 860 and database storage 856, creating shared folders 866, and with providing host access 854 and user access 870 to provisioned storage (e.g., such as using 866 and 860), and monitoring 868 particular file shares created.

After the above-mentioned 2 month time period, a map may be customized for the user and stored as a profile for the particular user. As described below, the map customized for the user for provisioning storage (stored as part of the user profile) is illustrated in FIG. 10 and the associated customized UI display is illustrated in FIG. 9

Figure 9:
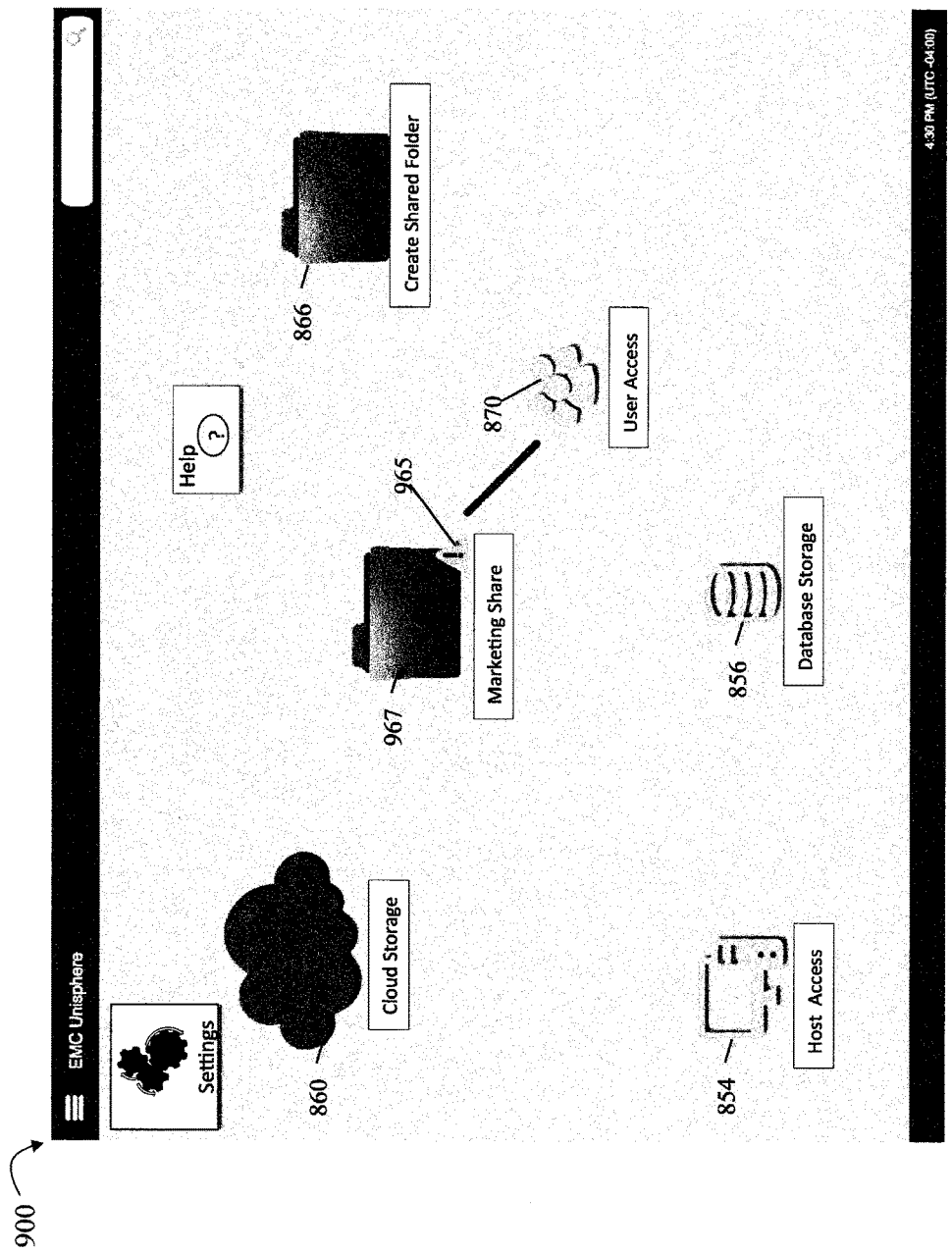

Referring to FIG. 9, shown is an example illustrating a fourth UI display that may be presented to the user at a fourth point in time after the above-mentioned 2 month time period has passed. FIG. 9 at the fourth point in time may be contrasted with FIG. 8 from the third point in time where UI elements 858, 862, and 864 of FIG. 8 have been removed since the user did not perform such operations during the 2 month time period. Additionally, during the 2 month time period, the user performed daily monitoring 868 of a particular file share created, marketing share 967. The monitoring task 868 may relate to an overall health indicator regarding the marketing share 967. Thus, a monitored health status for the marketing share 967 regarding the marketing share file system health may be displayed by a health icon 965. In this example, the exclamation point may currently indicate a warning or degraded health status for the marketing share file system 967. Other icons may be associated with other statuses (e.g., healthy, unavailable, and the like) that may be used in an embodiment in accordance with techniques herein. Other operations the user frequently performed related to user access 870 of the marketing share 967. For example, the user may have frequently viewed what users have been granted access to the marketing share 967. Thus, because operations regarding user access are commonly performed by the user, the map for the user results in creating a new association between user access UI element 870 and the marketing share UI element 967.

Figure 10:
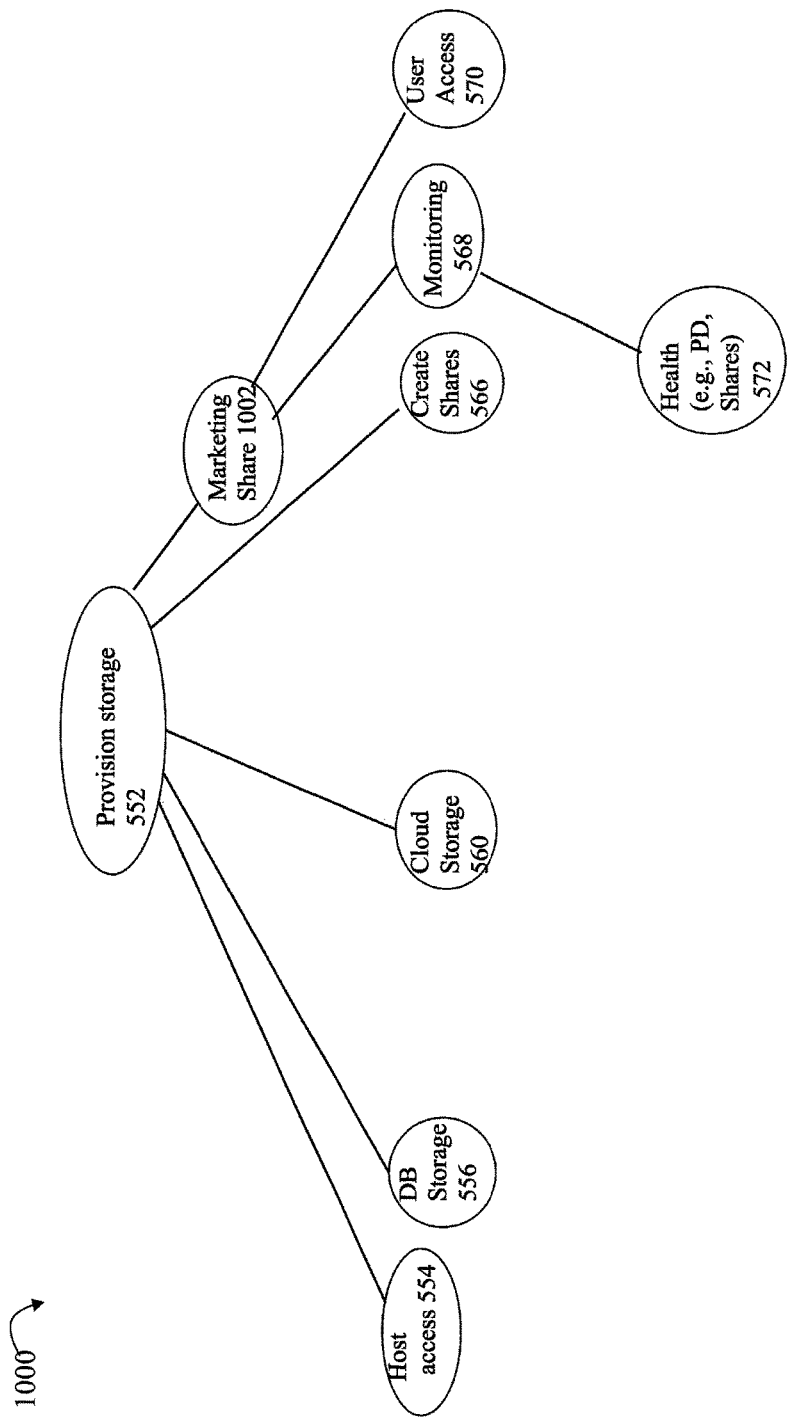

Referring to FIG. 10, shown is an example of a customized map for the provisioning storage task 552 created for the user described above in connection with FIG. 9. The example 1000 of FIG. 10 may be contrasted with the map of FIG. 5B. In FIG. 10, nodes 558, 562 and 564 have been removed from the original map of FIG. 5B. Additionally, the customized map of FIG. 10 includes node 1002 corresponding to the marketing share UI element 967. Node 1002 is associated with node 568 corresponding to the health status icon 965 displayed for marketing share 967. Node 1002 is also associated with node 570 denoting performing user access operations with respect to the marketing share 967.

Figure 11:
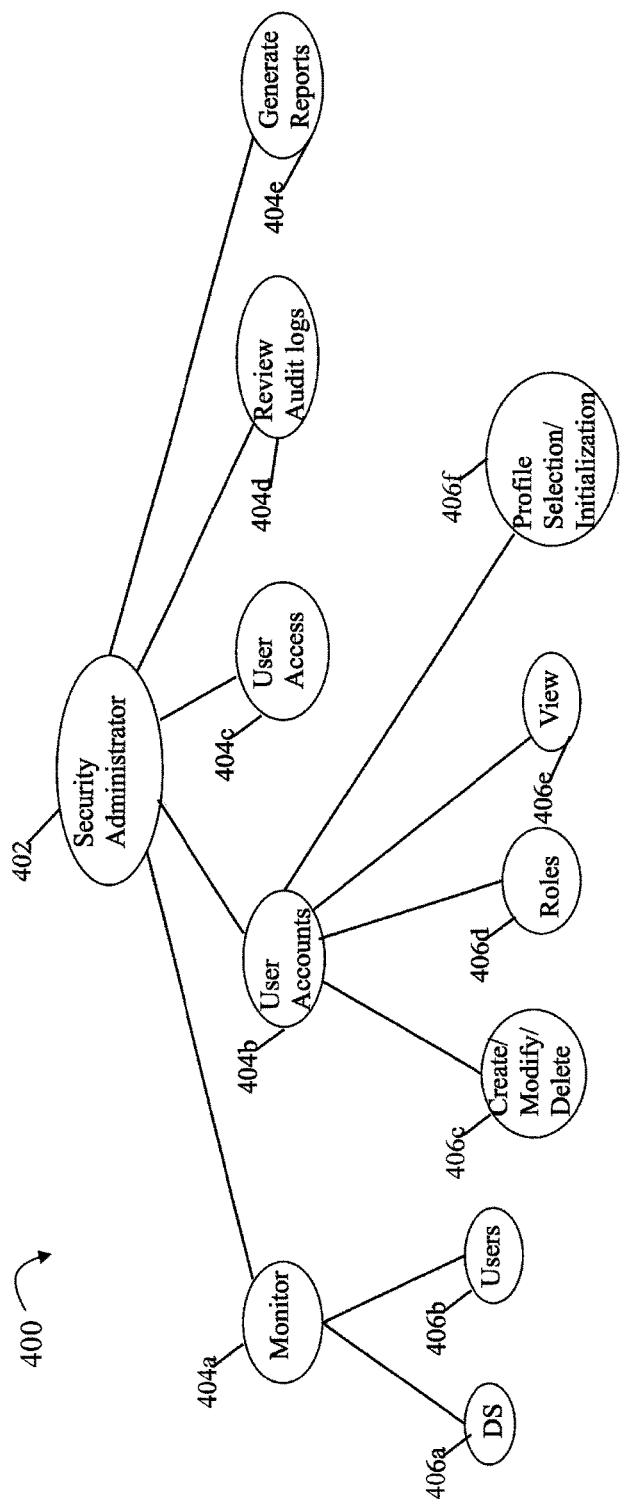

Referring to FIG. 11, shown is another example of a map as may be stored in the storage management patterns 122. The example 400 illustrates another general map outlining tasks or operations that may be performed for a user performing security administration. Relevant operations for security administration may include security monitoring operations 404*a*, user account operations 404*b*, user access operations 404*c* (e.g., granting/providing and viewing user access to provisioned storage), reviewing audit log 404*d* and generating security reports. 404*e*. For monitoring operations 404*a*, there may be options to monitor security aspects of users 406*b* (e.g., number of failed login attempts) and data storage systems 406*a* (e.g., what versions of software/patches are installed on which systems, number of failed login/accesses to different data storage systems). Node 406*c* may denote user account operations to create a new user account, modify an existing user account (e.g., modify user role for a particular account), and delete an existing user account. Node 406*d* may denote user account operations to view currently defined roles and associated privileges or operations that can be performed by each such role when assigned to a user. Node 406*e* may denote user account operations to view existing user account information. Node 406*f* may denote user account operations to initialize or select a user profile for a user account. As described herein, the profiles 104 may include customized user profiles of maps customized for a particular user. When creating a new user account, node 406*f* provides the administrator with options for specifying an existing user profile to use for the new user account. A copy may be made of the existing user profile for the new user account. Thus, the copy of the existing user profile may specify an initial map or set of maps for the new user account's user profile. The copy may then be further customized for the new user account based on various factors as described herein, such as user interactions and selections over time. For example, user 1 may have an existing first user profile customized for user 1. User 1 may be a security administrator. A second user 2 may be hired as a second security administrator. When creating the account for user 2, options associated with 406*f* provide for initializing a second user profile for user 2 where the second user profile is a copy of the first user profile. The second user profile may then be further customized for user 2 consistent with description elsewhere herein.

Figure 12:
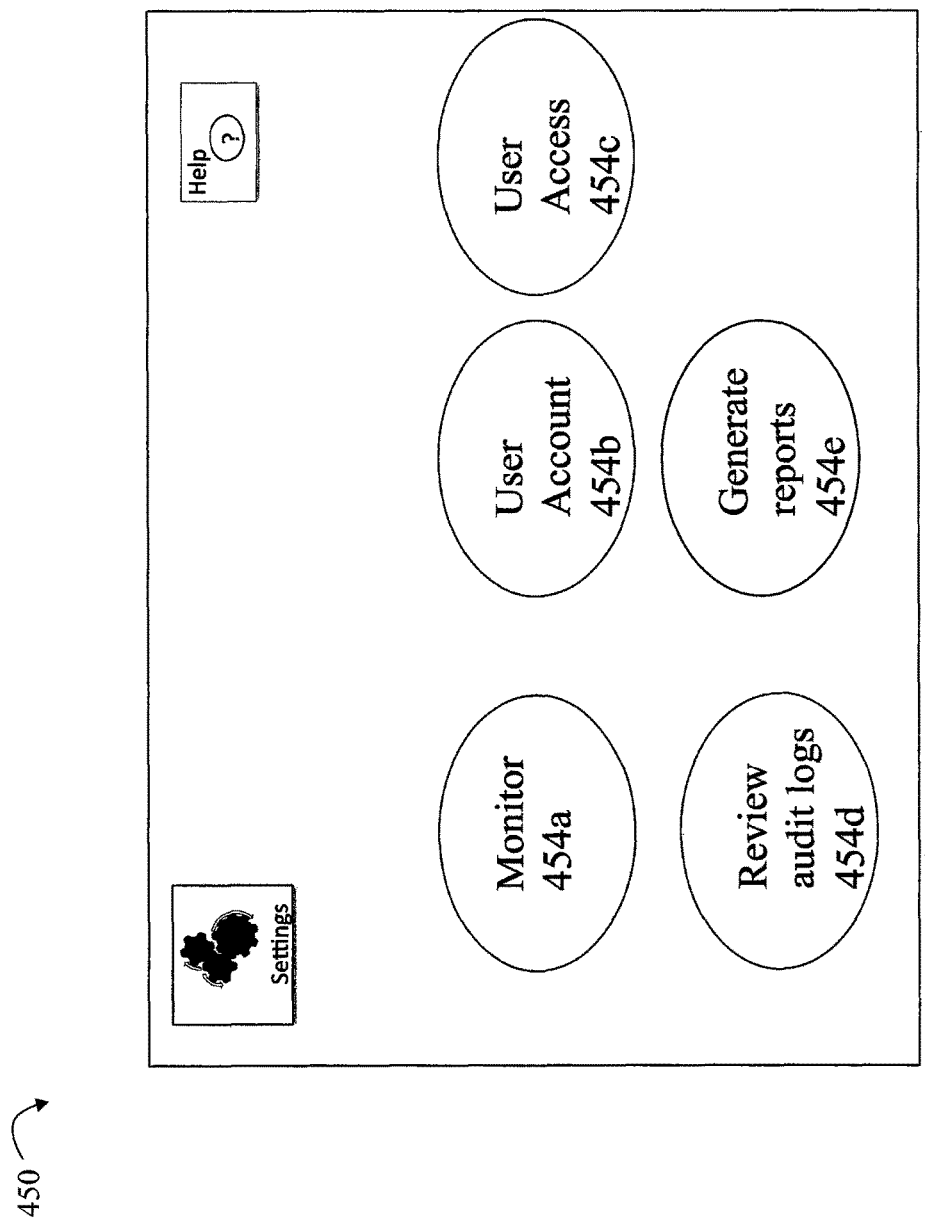

With reference back to FIG. 7, assume for a second example that the user enters "perform security administration" in area 710 rather than provisioning storage as the desired task. Responsive to entering "perform security administration" in area 710, UI display 450 of FIG. 12 may be presented to the user. The UI display of 450 may be initially displayed for the user when the user has not yet performed any security administration operations. As illustrated in FIG. 12, each of the UI elements 454*a-e* corresponds to nodes 404*a-e* respectively of the map from FIG. 11. Since the user has not performed any particular task or operation associated with UI elements 454*a-e*, all such UI elements may be displayed at the same size and opacity. Assume the user now performs security administration tasks for a first time period where such tasks are mostly account creation. At a second point in time after the first time period, the UI display 460 of FIG. 13A may be displayed. It should be noted that the user has performed all operations associated with UI elements 454a-e. However, operations or tasks associated with UI element 454b for user account operations has been performed much more frequently than the tasks or operations associated with any of 454a and 454c-e. Thus, UI display 450 displays UI element 454b as much larger in size relative to the other UI elements 454a and 454c-e.

Assume the user now performs security administration tasks for a second time period where such tasks are mostly report generation. At a third point in time after the second time period, the UI display 470 of FIG. 13B may be displayed. It should be noted that the user has performed all operations associated with UI elements 454a-e. However, operations or tasks associated with UI element 454e for user account operations has been performed much more frequently than the tasks or operations associated with any of 454a-d. Thus, UI display 470 displays UI element 454e as much larger in size relative to the other UI elements 454a-d.

Thus, as described herein, UI elements may be selectively displayed for a user where such UI elements expose functionality of the management application customized for the particular user. In this manner, the user may be provided with a limited and focused set of tasks or operations relevant to the particular user's desired tasks or operations commonly performed by the user. As the operations or tasks performed by the user may change over time, the profile for the user may also be customized dynamically to adapt to the changes in desired operations or tasks performed by the user. The profile may include customized maps of associated UI elements and management functionality relevant to particular tasks and operations performed by the user.

Additionally, as described herein the UI elements that are displayed may have varying or customized visual appearance depending on the particular user and the current time at which the UI display is rendered. A first set of UI elements may be visually enhanced relative to other UI elements if the first set of UI elements is determined by the mapping engine as more likely to be used or selected for a particular user at the current time of display. Visual aspects affected may include, for example, size of the UI element, location in the UI display or window, opacity or degree of shading, color, and the like. For example, UI elements more likely to be used or selected may be made the largest and shaded as the darkest UI elements on the screen. Thus, the mapping engine in an embodiment in accordance with techniques herein may perform processing to present to the user in the UI display particular functionality that is likely or expected to be used by the user at a particular point in time when interacting at the time the UI display is rendered.

Figure 13A:
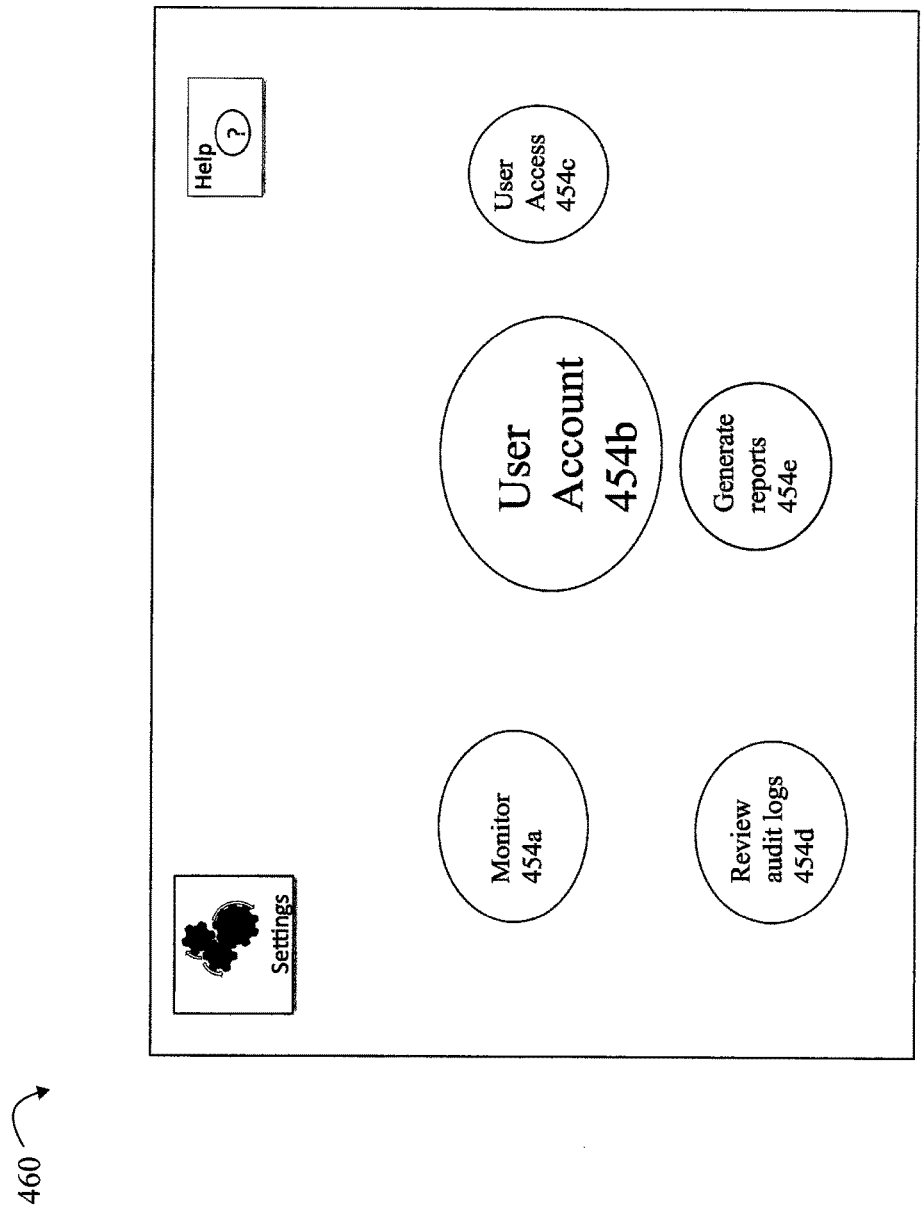
Figure 13B:
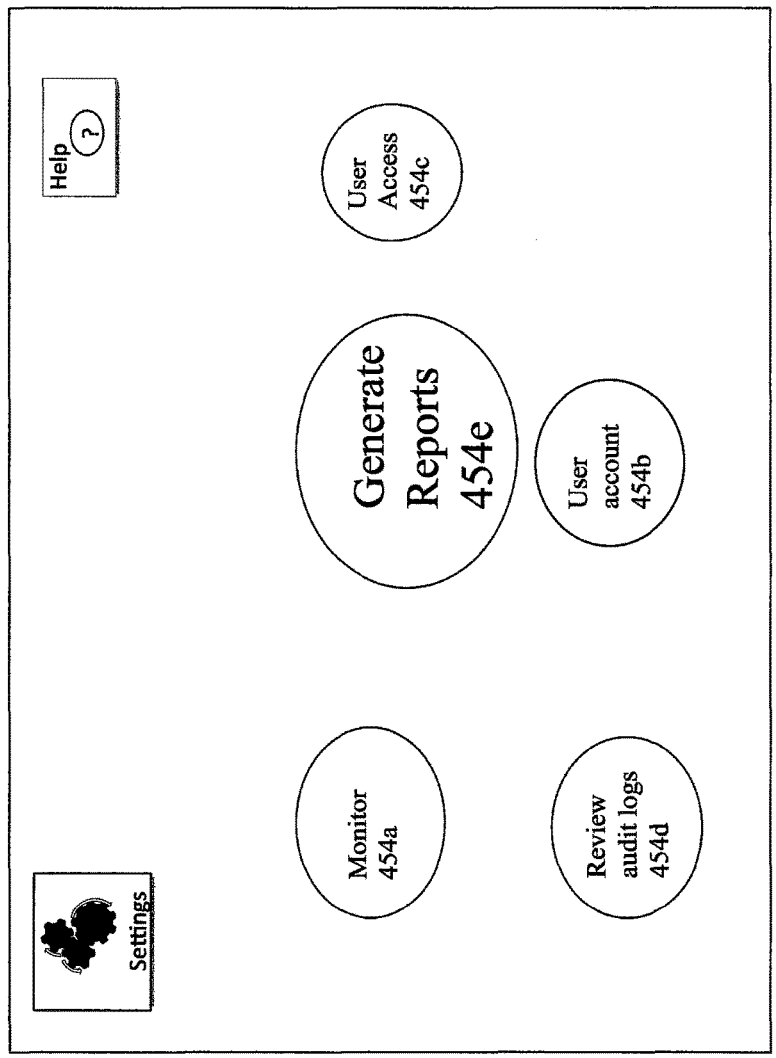

The mapping engine may determine whether or not to render particular UI elements having associated functionality at all and possibly remove one or more of them from a customized map of a user's profile. If particular tasks or operations are exposed in a set of rendered UI elements, the mapping engine may further vary the visual appearance of the rendered UI elements by varying one or more attributes (e.g., size, opacity, boldness, color, location on display) of the rendered UI elements in accordance with a weight or relative ranking. The weight or ranking may be based on factors affecting the importance and relevance of the task or operation to the user. For example, with reference to FIGS. 12, 13A and 13B, one or more factors may be used to determine a ranking of relative importance of the UI elements 454a-e to the user at each of the 3 different points in time at which the 3 UI displays of FIGS. 12, 13A and 13B are rendered. As described herein such as with reference to FIG. 2B, the one or more factors may relate to any of the inputs received by the mapping engine 110 where such inputs may generally relate to environmental inputs, profiles, capabilities, storage management patterns, and historical data.

As described herein such factors may include any of a role assigned to the user, recently performed tasks or operations, frequency of recent tasks or operations performed, time of day when a task was previously performed and the current time of day when the UI display is being rendered, and the day of week when a task was previously performed and the current day of the week when the UI display is being rendered. For the tasks or operations that are exposed via UI elements rendered in a display, the user is presented with a set of functionality that the user is likely to perform, select and/or utilize. For the tasks or operations of the management application exposes via the UI elements displayed, the tasks or operations may be ranked based on the one or more factors as described above and elsewhere herein denoting relative usefulness to user. The visual appearance of the UI elements rendered may be varied based on the relative ranking of the tasks or operations associated with the UI elements. A first set of one or more UI elements may be associated with tasks or operations having a higher ranking or relevance to the user at the current time than a second set of one or more other UI elements associated with lower ranked tasks or operations. In this case, the first set of one or more UI elements may be displayed in a more visually prominent or significant manner than UI elements of the second set. For example, UI elements of the first set may have a larger size and be bolder or darker in appearance than UI elements of the second set.

Figure 14:
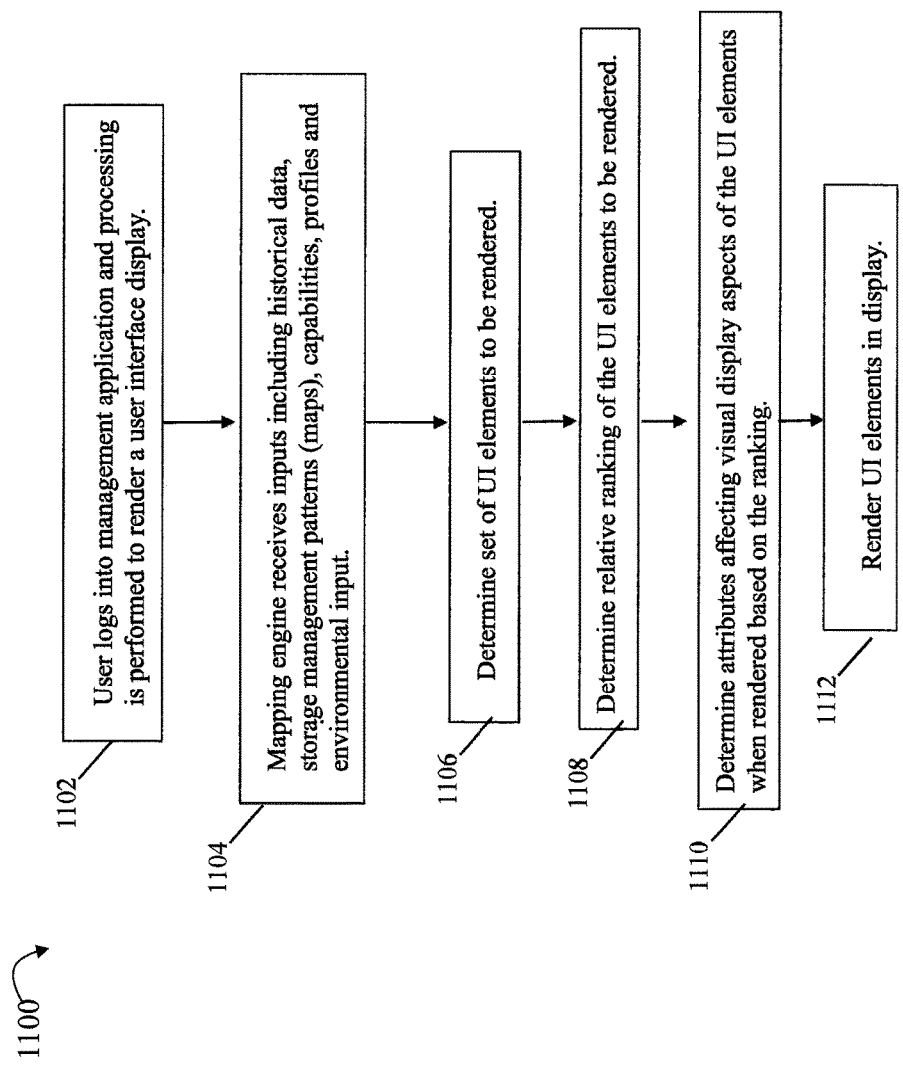
FIG. 14 is a flowchart of processing steps that may be performed in an embodiment in accordance with techniques herein.

Referring to FIG. 14, shown is a flowchart of processing steps that may be performed in an embodiment in accordance with techniques herein. The flowchart 1100 generally summarizes processing described above. At step 1102, a user logs into the management application and processing is performed by the application to render a user interface display. Such processing may include steps 1104, 1106, 1108, 1110 and 1112. In step 1104, the mapping engine receives inputs including historical data, storage management patterns (maps), capabilities, profiles and environmental input. Such processing to render the UI display may include step 1106 where a set of UI elements that may be rendered is determined. Each UI element may be associated with a task or operation that may be performed by the current user. At step 1108, a relative ranking of the tasks or operations exposed by the UI elements in the set may be determined. In step 1110, attributes affecting visual display aspects of the UI elements, when rendered, may be determined. The visual display aspects may be varied for particular UI elements based on the ranking. For example, the size of each rendered UI element displayed relative to other rendered UI elements may be varied based on the ranking where a larger UI element associated with a first task or operation may be ranked higher than another smaller UI element associated with a lower ranked task or operation. In step 1112, the UI elements of the set may be rendered.

An embodiment may implement the techniques herein using code executed by a processor. For example, an embodiment may implement the techniques herein using code which is executed by a processor of the data storage system. As will be appreciated by those skilled in the art, the code may be stored on the data storage system on a computer-readable storage medium (also referred to as computer readable medium) having any one of a variety of different forms including volatile and nonvolatile, removable and non-removable media implemented in any method or technology for storage of information such as computer readable instructions, data structures, program modules or other data. Computer-readable storage media, or computer-readable medium, includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can be accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of rendering a user interface display of an application comprising:
    creating, using a processor, a new user account for a user, wherein said creating includes initializing a user profile for the user with an existing profile of another user, wherein the user profile is a copy of the existing profile of the another user;
    providing, using a processor, a plurality of inputs to a mapping engine;
    determining, using a processor and by the mapping engine in accordance with the plurality of inputs, a set of operations relevant to the user that interacts with a user interface of the application at a current point in time, wherein the set of operations defines a subset of functionality of the application customized for the user and wherein the plurality of inputs include the user profile and a default profile for a first role assigned to the user, wherein said default profile identifies a plurality of operations of the set of operations as relevant to the first role assigned to the user;
    determining, using a processor, a ranking of the set of operations, wherein said ranking is in accordance with the plurality of inputs further comprising capabilities of a system managed using the application, wherein the capabilities include a current state of the system and identify whether the system is currently incapable, due to a failed network connection, of performing a particular operation or task having an associated user interface element; and
    rendering, using a processor, a set of user interface elements corresponding to the set of operations relevant to the user, wherein the set of user interface elements includes two user interface elements associated with two of the plurality of operations identified by the default profile, and wherein the two user interface elements are displayed by said rendering to have relative sizes in accordance with the ranking of the set of operations, wherein, when the system is currently incapable, due to the failed network connection, of performing the particular operation or task, the associated user interface element is omitted from the user interface display, wherein the failed network connection is a connection to a remote data storage system, and wherein, due to the failed network connection to the remote data storage system, the system is currently incapable of performing the particular operation or task related to remote mirroring of provisioned storage, and wherein the associated user interface element that is omitted from the user interface display is for performing the particular operation or task related to remote mirroring of provisioned storage.

2. The method of claim 1, wherein the set of user interface elements includes a plurality of user interface elements, and wherein said ranking denotes any of a relative usefulness of each operation of the set of operations to the user and an expected likelihood that the user will perform each operation of the set of operations.

3. The method of claim 2, wherein the ranking is in accordance with the plurality of inputs including any of environmental inputs, profiles, predetermined management patterns of related application operations, and historical data.

4. The method of claim 3, wherein the plurality of inputs include one or more factors regarding any of observed user activity and interactions of the user with the user interface.

5. The method of claim 4, wherein the one or more factors include which operations of the set of operations have been previously performed by the user.

6. The method of claim 4, wherein the one or more factors include a frequency that each operation of the set of operations has been performed by the user within a defined time period prior to the current point in time.

7. The method of claim 4, wherein the one or more factors include which one or more operations of the set of operations has been performed by the user within a defined time period prior to the current point in time.

8. The method of claim 4, wherein the one or more factors include whether a time of day when each operation of the set of operations has been performed previously matches a current time of day associated with the current point in time.

9. The method of claim 4, wherein the one or more factors include whether a day of a week when each operation of the set of operations has been performed previously matches a current day of a week denoted by the current point in time.

10. The method of claim 2, wherein a first operation of the set of operations has a highest position in said ranking thereby denoting the first operation is ranked as having any of a highest level of usefulness to the user and highest expected likelihood of selection by the user, and wherein the first operation is associated with a first of the plurality of user interface elements.

11. The method of claim 10, further comprising:
    varying one or more attributes affecting visual display characteristics of the first user interface element whereby the first user interface element, when rendered, is visually more prominent than any other operation of the set of operations ranked lower than the first operation.

12. The method of claim 11, wherein the first user interface element has a larger size than a second user interface element associated with a second operation of the set of operations ranked lower than the first operation.

13. The method of claim 11, wherein the first user interface element is darker in appearance than a second user interface element associated with a second operation of the set of operations ranked lower than the first operation.

14. The method of claim 1, wherein the application is a data storage management application.

15. The method of claim 14, wherein the set of operations includes data storage management operations.

16. A system comprising:
    a processor; and
    a memory comprising code stored therein that, when executed, performs a method of rendering a user interface display of an application comprising:

creating, using a processor, a new user account for a user, wherein said creating includes initializing a user profile for the user with an existing profile of another user, wherein the user profile is a copy of the existing profile of the another user;

providing, using a processor, a plurality of inputs to a mapping engine;

determining, using a processor and by the mapping engine in accordance with the plurality of inputs, a set of operations relevant to the user that interacts with a user interface of the application at a current point in time, wherein the set of operations defines a subset of functionality of the application customized for the user and wherein the plurality of inputs include the user profile and a default profile for a first role assigned to the user, wherein said default profile identifies a plurality of operations of the set of operations as relevant to the first role assigned to the user;

determining a ranking of the set of operations, wherein said ranking is in accordance with the plurality of inputs further comprising capabilities of a system managed using the application, wherein the capabilities include a current state of the system and identify whether the system is currently incapable, due to a failed network connection, of performing a particular operation or task having an associated user interface element; and rendering a set of user interface elements corresponding to the set of operations relevant to the user, wherein the set of user interface elements includes two user interface elements associated with two of the plurality of operations identified by the default profile, and wherein the two user interface elements are displayed by said rendering to have relative sizes in accordance with the ranking of the set of operations, wherein, when the system is currently incapable, due to a failed network connection, of performing the particular operation or task, the associated user interface element is omitted from the user interface display, wherein the failed network connection is a connection to a remote data storage system, and wherein, due to the failed network connection to the remote data storage system, the system is currently incapable of performing the particular operation or task related to remote mirroring of provisioned storage, and wherein the associated user interface element that is omitted from the user interface display is for performing the particular operation or task related to remote mirroring of provisioned storage.

17. A non-transitory computer readable medium comprising code stored thereon that, when executed, performs a method of rendering a user interface display of an application comprising:

creating, using a processor, a new user account for a user, wherein said creating includes initializing a user profile for the user with an existing profile of another user, wherein the user profile is a copy of the existing profile of the another user;

providing, using a processor, a plurality of inputs to a mapping engine;

determining, using a processor and by the mapping engine in accordance with the plurality of inputs, a set of operations relevant to the user that interacts with a user interface of the application at a current point in time, wherein the set of operations defines a subset of functionality of the application customized for the user and wherein the plurality of inputs include the user profile and a default profile for a first role assigned to the user, wherein said default profile identifies a plurality of operations of the set of operations as relevant to the first role assigned to the user;

determining, using a processor, a ranking of the set of operations, wherein said ranking is in accordance with the plurality of inputs further comprising capabilities of a system managed using the application, wherein the capabilities include a current state of the system and identify whether the system is currently incapable, due to a failed network connection, of performing a particular operation or task having an associated user interface element; and rendering, using a processor, a set of user interface elements corresponding to the set of operations relevant to the user, wherein the set of user interface elements includes two user interface elements associated with two of the plurality of operations identified by the default profile, and wherein the two user interface elements are displayed by said rendering to have relative sizes in accordance with the ranking of the set of operations, wherein, when the system is currently incapable, due to the failed network connection, of performing the particular operation or task, the associated user interface element is omitted from the user interface display, wherein the failed network connection is a connection to a remote data storage system, and wherein, due to the failed network connection to the remote data storage system, the system is currently incapable of performing the particular operation or task related to remote mirroring of provisioned storage, and wherein the associated user interface element that is omitted from the user interface display is for performing the particular operation or task related to remote mirroring of provisioned storage.

18. The non-transitory computer readable medium of claim 17, wherein the set of user interface elements includes a plurality of user interface elements, and wherein said ranking denotes any of a relative usefulness of each operation of the set of operations to the user and an expected likelihood that the user will perform each operation of the set of operations.

19. The non-transitory computer readable medium of claim 18, wherein the ranking is in accordance with the plurality of inputs including any of environmental inputs, profiles, predetermined management patterns of related application operations, and historical data.

* * * * *